United States Patent [19]

Hass

[11] 3,751,972

[45] Aug. 14, 1973

[54] LEAK DETECTOR FOR SEALED CONTAINERS

[75] Inventor: Hyman Haas, Westbury, N.Y.

[73] Assignee: Applied Fluidics Inc., Westbury, N.Y.

[22] Filed: Aug. 2, 1972

[21] Appl. No.: 277,481

[52] U.S. Cl. .................................................. 73/45.4
[51] Int. Cl. .............................................. G01m 3/04
[58] Field of Search ........................... 209/73, 80, 88; 73/37.5, 37.6, 37.7, 41.3, 41.4, 45.4, 49.3

[56] References Cited
UNITED STATES PATENTS

| | | | |
|---|---|---|---|
| 2,011,332 | 8/1935 | Chapman | 73/45.4 |
| 3,438,259 | 4/1969 | Bossert, Jr. | 73/49.3 X |
| 3,650,145 | 3/1972 | Nelson | 73/49.3 |
| 3,592,049 | 7/1971 | Johanski, Jr. | 73/45.2 |
| 3,178,932 | 4/1965 | Stuchbery et al. | 73/45 X |

*Primary Examiner*—Allen N. Knowles
*Attorney*—Michael Ebert

[57] ABSTRACT

A leak detector for testing sealed containers formed of semi-rigid or flexible material. The container to be tested is placed in a chamber which is thereafter pressurized at a pressure distinctly different from the internal container pressure, whereby the container is caused to physically distort. A container dimension is first sensed before the chamber is pressurized to produce a first signal representing the dimension resulting from the difference between internal pressure and atmospheric pressure, this first signal being held. When the container is under pressure in the chamber and a predetermined time interval has elapsed, the container dimension is again sensed to produce a second signal representing the dimension as a result of the difference between internal pressure and chamber pressure. The held first signal and the second signal are compared and if the disparity therebetween indicates a significant change in dimension, the container is accepted, whereas if there is little disparity between signals, the container is rejected.

9 Claims, 5 Drawing Figures

LEAK DETECTOR FOR SEALED CONTAINERS

BACKGROUND OF THE INVENTION

This invention relates generally to leak detectors for sealed containers, and more particularly to a leak detection system for testing a group of sealed containers on a production line basis without interrupting or slowing down production.

In the packaging of products, such as foods, beverages, drugs and cosmetics, it is not sufficient for quality control purposes to know whether the container which is to be filled with the product, is free of leaks. Even with an empty container in perfect condition, there is no assurance that the container will be acceptable when filled and sealed, for the seal may be defective. With products intended to be stored by the consumer for prolonged periods, it is vital that the container be properly sealed, for otherwise the contents may leak or be exposed to the atmosphere and deteriorate.

The idea of testing sealed containers formed of semi-rigid or flexible material by sensing the distortion of the containers as a result of the difference between external and internal pressure is already known. Thus, in the Landrum U.S. Pat. No. 1,025,744, a sealed container is tested for leaks by reducing the extraneous pressure on the container. When the container being tested has a proper seal, an audible sound is produced in that the end of the container pops out because of the pressure difference, thereby indicating a leak-free container. In Foss, U.S. Pat. No. 2,093,429, flexure of the sealed container in a vacuum chamber is detected by means of an electrical contact which is positioned to be engaged only when the container distorts, the contact closure producing a signal indicative of the seal condition.

The concern of the present invention is with the testing of container seals on a mass production basis. In mass production, the usual procedure is to employ multiple-sealing heads. The heads are adapted to concurrently seal a batch of containers placed in a tray or box. After the sealing operation is completed, the tray is advanced by a conveyor belt to an output station. In a production line of this type it is not feasible to remove sealed containers one at a time from the tray to carry out individual tests, for this technique would slow down production considerably.

SUMMARY OF THE INVENTION

The main object of this invention is to provide an improved technique and apparatus for testing sealed containers formed of semi-rigid or flexible material.

More particularly, it is an object of this invention to provide an in-line production system adapted to test a batch of containers and either accept the entire batch in the event the seals on the containers are all good, or to reject the entire batch, if the seal on one or more containers is defective, or to reject any individual container in the batch.

Among the advantages of the present invention are that it is non-destructive, it is applicable to sealed containers of almost any size and shape, and it is sanitary and non-contaminating and hence acceptable for food and drug products.

A testing system according to the invention is completely automatic and functions at high speed so that the testing procedure does not slow down or interfere with production. The system is also capable of indicating which head in a multiple-sealing head assembly is responsible for defective seals, thereby making possible the automatic replacement of the defective head without shutting down production.

Briefly stated, these objects are accomplished in a seal testing system wherein containers to be tested for leaks are placed in a chamber which is thereafter pressurized at a pressure distinctly different from the internal pressure of the container. A container dimension is first sensed before the chamber is pressurized to produce a first signal representing the dimension resulting from the difference between internal container pressure and atmospheric pressure, which first signal is held. When the container is under pressure and a predetermined time interval has elapsed, the container dimension is again sensed to produce a second signal representing the dimension resulting from the difference between internal container pressure and chamber pressure.

The held first signal and the second signal are then compared, and if the disparity between signals indicates a significant change in dimension, the container is accepted, but if there is little or no disparity between signals, the container is rejected, for the absence of can distortion after the predetermined time has elapsed, is evidence of a defective seal.

In a preferred embodiment of the system for batch testing of cans, a batch of cans is placed in the chamber, a separate sensor being provided for each can to produce an analog signal representing the dimension being tested. Before the chamber is pressurized, the analog signals from the sensors are sequentially converted into equivalent digital signals which are applied to respective storage devices to be held. When the batch of cans is under pressure in the chamber and a predetermined time interval has elapsed, analog signals derived from the sensors are again sequentially converted into digital signals which are applied to respective digital comparators where they are compared with the signals held in the storage devices.

Each comparator produces an output indicative of the disparity, if any, between the signals applied thereto. The outputs from the comparators are applied to an AND circuit which is operatively coupled to an accept/reject mechanism such that if all outputs indicate good seals, the batch is accepted, but if one or more outputs indicate a defective seal, the entire batch is rejected.

The output of each comparator is stored in an accept/reject memor device ($FR_1$ to $FR_n$) to reject any individual containers in the batch if desired. This signal is also used to indicate the faulty sealing head.

OUTLINE OF THE DRAWINGS

For a better understanding of the invention as well as other objects and further features thereof, reference is made to the following detailed description to be read in conjunction with the accompanying drawings, wherein.

DESCRIPTION OF THE INVENTION

Before considering the structure and functions of a leak detector in accordance with the invention, the principles underlying its operation will first be analyzed. With a sealed container formed of semi-rigid or flexible material such as a plastic or metal can, the following three possible conditions must be taken into account.

Condition A — Here we have a container filled with a product at a given internal pressure $P_t$. The container is perfectly sealed; hence, when placed within a chamber whose pressure is $P_o$ which is distinctly different from pressure $P_t$, the flexible container will undergo physical distortion as a result of the pressure difference. This distortion is indicative of the absence of a leak.

Condition B — Here we have the same filled container at internal pressure $P_t$ but this container has a minute leak, say a hole 0.005 inch or smaller. When placed in a chamber at pressure $P_o$, this container will initially distort as a result of the pressure difference, but the container will thereafter return to its original size and shape when the internal and external pressures gradually equalize.

Condition C — Here we have a similar filled container but with no seal or a large leak. When this container is placed in a chamber whose pressure is $P_o$, no distortion at all will result, for the same pressure is quickly established within the container.

When testing the mechanical integrity of a closed or sealed container, only Conditions A, B and C need be considered. In the present invention, the rate of distortion of a supposedly sealed container is measured at a controlled pressure $P_o$ different from the internal pressure value $P_t$ to detect leaks.

A container free of leaks (Condition A) will undergo a maximum dimensional change which will be maintained unchanged during a given time period, a container with a minute leak (Condition B) will initially undergo a maximum dimensional change which will thereafter diminish slightly during the same period, and a container with no seal at all (Condition C), will not undergo any change in this period.

Figure 1:
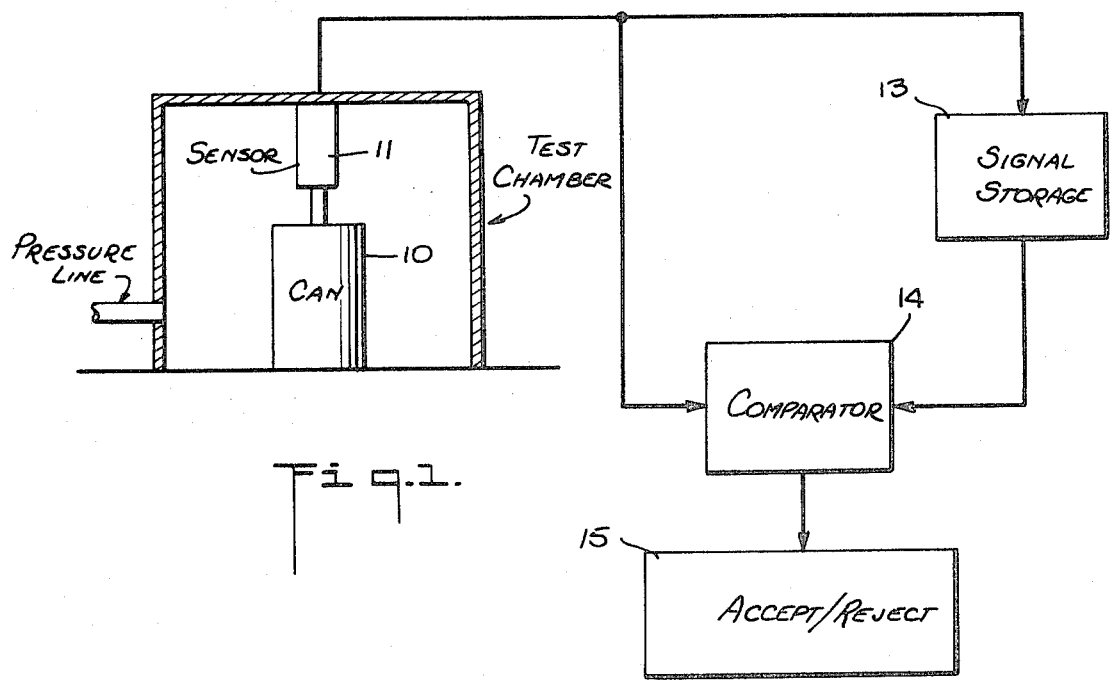
FIG. 1 is a block diagram of a simplified leak testing system according to the invention.

Referring now to FIG. 1, there is shown a simle analog system for testing the seal condition of a container 10. The system is responsive to conditions A, B and C to produce an "accept" signal when condition A is encountered and a "reject" signal when conditions B or C are met. For this purpose a sensor 11 is provided which, in practice, may be a linear, variable differential transformer (LVDT) whose shiftable core engages can 10. Sensor 11 produces an analog signal that is proportional to core displacement as a consequence of can distortion. When physical contact is undesirable, as is the case with some types of cans, a pressure sensor may be used which is responsive to the change in volume between the test chamber and the container that arises from can distortion.

Testing is carried out in a chamber which is initially unpressurized so that the external pressure on can 10 is at the outset, atmospheric ($P_a$). Testing is conducted in a timed sequence by means of a suitable timing circuit cooperating with the various elements of the system shown in FIG. 1. First, a signal $R_1$ is derived from sensor 11 when chamber 12 is at atmospheric pressure. Signal $R_1$ which reflects the can dimension as a result of the difference between internal pressure $P_t$ and atmospheric pressure $P_a$, is fed to a memory or storage device 13 which, in practice, may be fluidic or electronic in nature. Signal $R_1$ is held in the storage device.

Second, chamber 12 is pressurized at pressure $P_o$ and after a predetermined time interval, a signal $\Delta R_1$ is derived which reflects the distortion of can 10 as a result of the difference between internal can pressure $P_t$ and external pressure $P_o$. Signal $\Delta R_1$ is applied to a comparator 14 which compares the stored signal $R_1$ with signal $\Delta R_1$.

If the change between the first signal $R_1$ and the second signal $\Delta R_1$, as indicated by the output of comparator 14, equals or exceeds a predetermined value in the predetermined time interval between the signals, the container is accepted. The output of comparator 14 is applied to an accept-reject mechanism 15 which sends the container, after the test is completed, either down the line to the production output or to a side line for rejection. If, therefore, the output value of the comparator is less than the predetermined value as a result of an unacceptably small leak or is equal to zero because of a gross leak producing no can distortion, the can is rejected.

While in the analog system disclosed disclosed in connection with FIG. 1, only one can is tested at a time, one may arrange the system to test two or more cans simultaneously.

Figure 2:
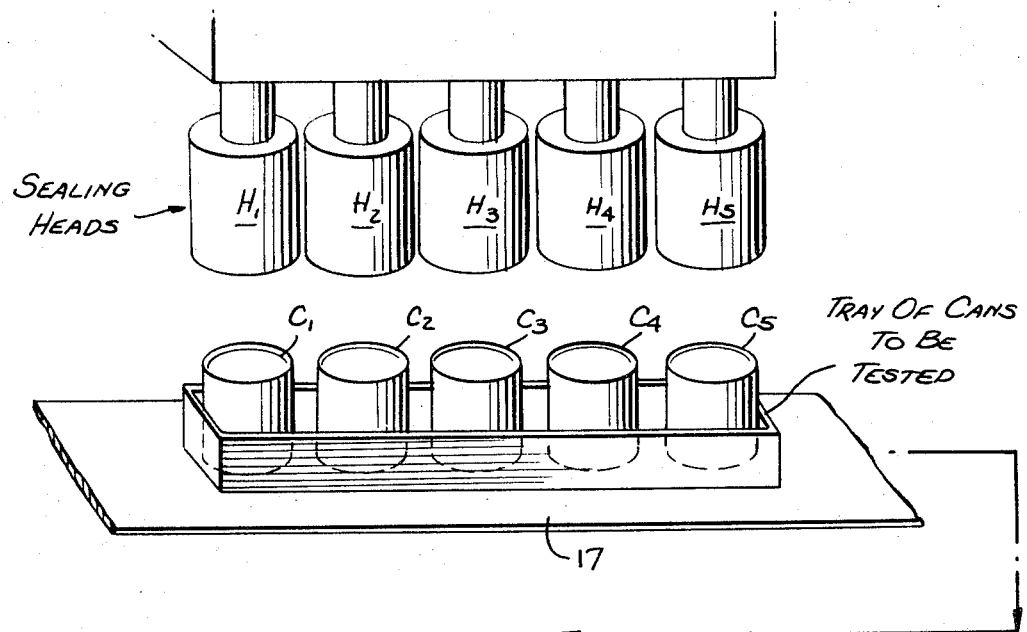
FIG. 2 is a block diagram of a batch testing system according to the invention.
Figure 2:
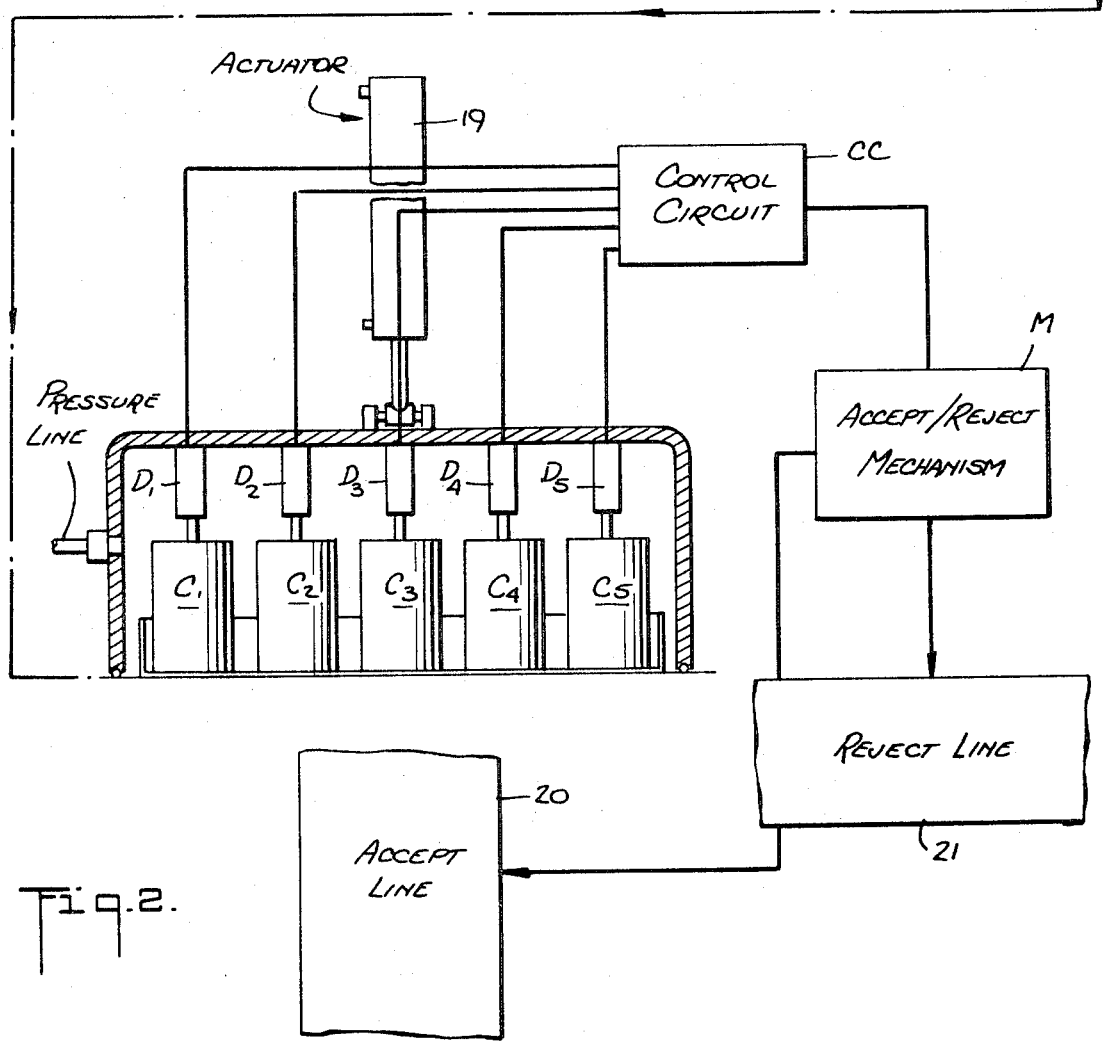

Referring now to FIG. 2, we shall now consider a more sophisticated system in accordance with the invention, the system being adapted to test sealed cans on a production line basis. A batch of cans, which in the example illustrated, consists of five cans $C_1$, $C_2$, $C_3$, $C_4$ and $C_5$, are held in a carrier tray 16 and are brought to a sealing station by a conveyor belt 17 or similar means. The actual number of cans in the batch depends on the production facility.

At the sealing station, a group of five sealing heads, $H_1$, $H_2$, $H_3$, $H_4$ and $H_5$, functions to seal the five cans brought into registration with the heads. The particular form of sealing mechanism employed for this purpose forms no part of the present invention.

After the batch of cans is sealed by the heads, the tray 16 is advanced by conveyor belt 17 to a testing station provided with a test chamber 18 having a suitable actuator 19 adapted to lift the chamber to admit a tray of cans and to thereafter close the chamber, the chamber being again lifted to permit the discharge of the tray. Chamber 18 is provided with an air or vacuum line 20 whereby after the chamber is closed and hermetically sealed, the chamber may be pressurized (negatively or positively) to create an external pressure $P_o$ which is distinctly different from the normal internal can pressure $P_t$.

When the chamber is closed, the deflectable elements of suitable sensors $D_1$, $D_2$, $D_3$, $D_4$ and $D_5$ which may be LVDT devices, engage the top of cans $C_1$ to $C_5$ in registration therewith. Each sensor produces an analog signal whose amplitude is a function of the associated can dimension. Hence, when the chamber is closed and is at atmospheric pressure, a first signal is produced that reflects the associated can dimension as a result of the difference between atmospheric pressure $P_a$ and internal can pressure $P_t$. When the chamber is thereafter pressurized, each sensor produces a second signal reflecting the associated can dimension as a result of the difference between chamber pressure $P_o$ and can pressure $P_i$.

The outputs of sensors $D_1$ to $D_5$ are applied to a control circuit CC adapted to sequentially test each can in the batch thereof and to produce an output signal indicating that all cans are acceptably sealed or that one or more of the cans in the batch is defectively sealed. This output signal is applied to an accept-reject mechanism M which, should the output signal from the control circuit CC indicate that all cans in the batch are acceptable, acts to transfer the tray of cans to an accept conveyor 21A. But if one or more of the cans in the testing batch is defective, the batch is transferred from the test station to a reject line 21B so that it is diverted from the output.

In a mass production system in which cans are processed in batches, it is possible to indicate the defective cans, and to replace them, or to reject the entire batch.

Figure 3:
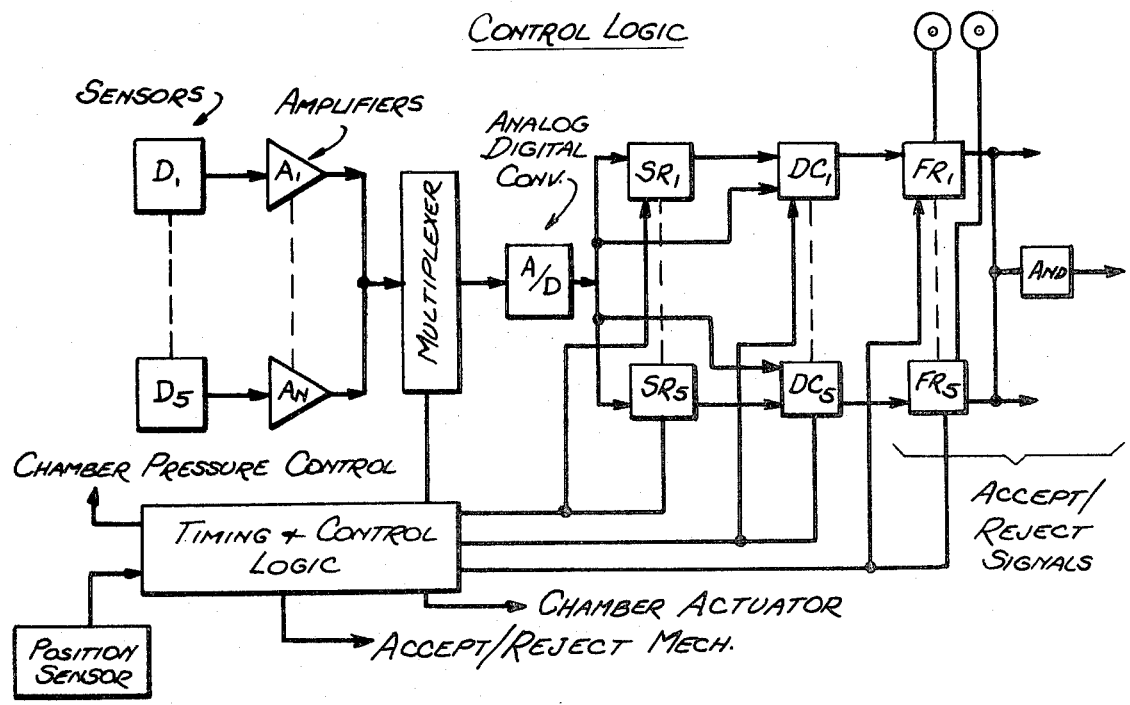
FIG. 3 is a schematic diagram of the circuit included in the system shown in FIG. 2.

Referring now to FIG. 3, the details of control circuit CC are shown. Signals generated by sensors $D_1$ to $D_5$ are fed into amplifiers $A_1$ to $A_5$, respectively, which function to condition and amplify each input analog signal to produce an analog output signal that is a linear function of the change in the size of the associated can under test as a result of a difference between the internal can pressure and the pressure external thereto.

The outputs of amplifiers $A_1$ to $A_5$ are applied to a multiplexer 22 that operates under the control of a timing and control logic circuit 23 sequentially to feed these outputs to an A/D converter 24. Converter 24 functions to convert the applied analog signal to equivalent digital values.

Figure 4:
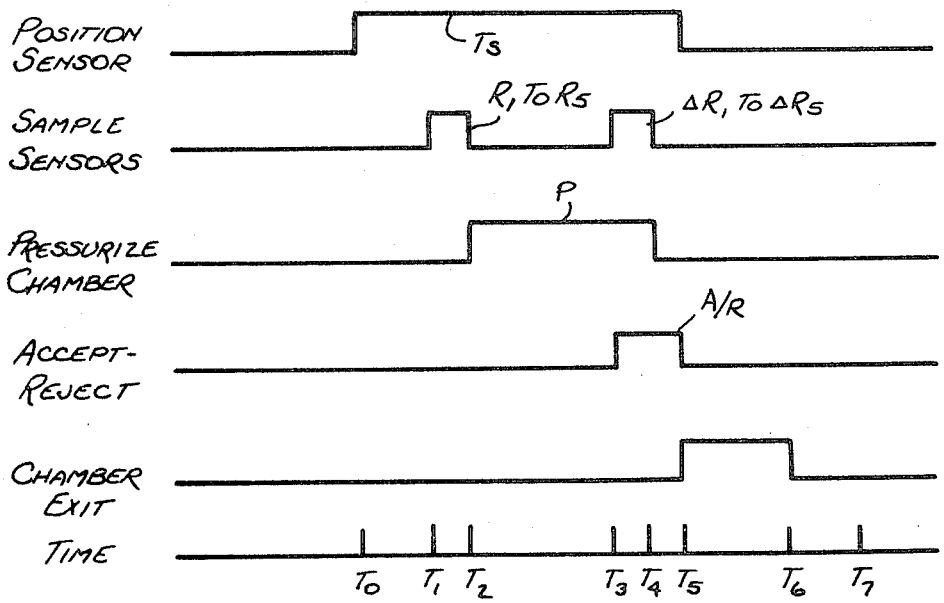
FIG. 4 is the timing diagram of the system shown in FIG. 2.

The timing and control logic circuit 23 controls the multiplexing of the analog signals to the A/D converter, the timing of all events, including the shifting of data in and out of the storage memory and the control of the sensors, activators, pressure and the accept/reject mechanism. Thus, when a box containing a batch of cans to be tested enters the test chamber 18, the presence of the box at the proper test position is sensed by a position sensor 25 which produces a test signal TS. As indicated in the functional timing diagrams in FIG. 4, test signal TS starts at time $T_o$, the beginning of the test cycle and is maintained throughout the succeeding points in time $T_1$, $T_2$ and $T_3$, the test signal terminates at time $T_4$.

In the interval between times $T_1$ and $T_2$, the chamber is at amospheric pressure $P_a$ and signals $R_1$ to $R_5$ sequentially sampled from sensors $D_1$ to $D_5$ are converted into equivalent digital signals. These are stored in storage registers $SR_1$ to $SR_5$, respectively. Signals $R_1$ to $R_5$ appear during the interval between times $T_1$ and $T_2$, as shown in the timing diagram.

The chamber is maintained under pressure during the interval between times $T_2$ and $T_4$ as indicated by P in the timing diagram. During this period between times $T_3$ and $T_4$ the sensors $D_1$ to $D_5$ are again sequentially sampled and converted into equivalent digital signals $\Delta R_1$ to $\Delta R_5$, which signals are fed into one input of digital comparators $DC_1$ to $DC_5$, respectively. The digital signals $R_1$ to $R_5$ from storage registers $SR_1$ to $SR_5$ are fed to the other input of these comparators where they are compared with digital signals $\Delta R_1$ to $\Delta R_5$.

If the change in measurements equals or exceeds a predetermined value in the predetermined time ($\Delta S/\Delta T$), the containers are accepted. Should $\Delta S/\Delta T$ be less than the predetermined value (small leak), or equal to zero ($\Delta S/\Delta T=0$) equivalent to no dimensional change as a result of a gross leak, the containers are rejected.

The information produced by comparators $DC_1$ to $DC_5$ is stored in final registers $FR_1$ to $FR_5$ and then used to individually identify the rejected and accepted containers. Each register is coupled to an indicator ($I_1$ to $I_5$) so that one can see which of the five cans in the test batch is defective. When the same final register repeatedly indicates a defective seal, this generally means that one of the sealing heads in the groups thereof ($H_1$ to $H_5$) is responsible for these defects. This fact may be used to automatically replace this malfunctioning head with a fresh head.

Thus, the indicators $I_1$ to $I_5$ may be coupled to suitable counters or frequency indicators which, when a given number of defects is sensed, serve to actuate a head replacement mechanism. For example, if for a series of 10 indications, three or more defects are sensed, then the responsible head will be replaced automatically.

All of final registers $FR_1$ to $FR_5$ are coupled to an AND or coincidence circuit. If all the registers indicate acceptable seals, then the AND circuit sends a signal indicative of this fact to the accept/reject mechanism M and the batch is passed through, but if the registers indicate the presence of one or more defective seals, this fact is indicated and the accept/reject mechanism transfers the batch to the reject belt. Diverting the batch enables one to replace the defective containers, and recycle the batch.

The accept/reject mechanism is operative during the interval between $T_3$ and $T_5$ as shown by form A/R in the timing diagram. At the end of this interval, the chamber is raised and the test batch is discharged during the interval between times $T_5$ and $T_6$. The period between $T_6$ and $T_7$ is the interval during which the next batch of cans enters the chamber, at which point the test cycle is repeated.

Figure 5:
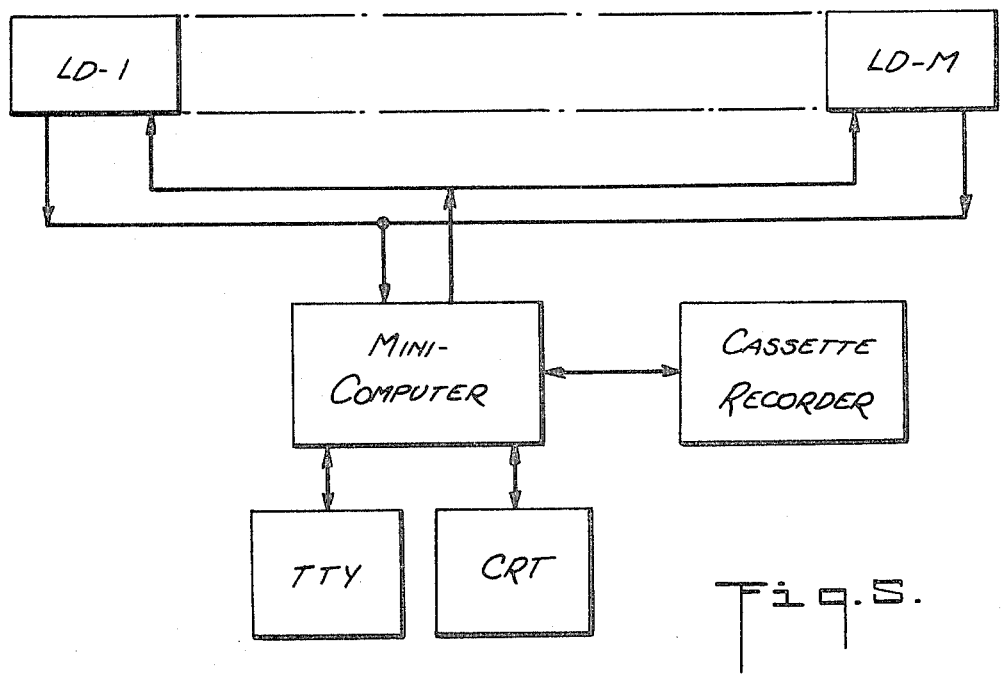
FIG. 5 is a block diagram showing a computer-controlled testing system according to the invention.

If many leak detector systems are used in a single plant, the timing and control logic functions for all the leak detector systems may be performed by a single mini-computer, as shown in FIG. 5. In this system, the mini-computer, typically one with 8,000 core memories, performs the timing and control functions for all leak detector systems LD-1 through LD-n which, in practice, may be several dozen systems. In addition, the computer could be used to collect quality control data to generate normal distribution curves and to close the loop around production by making adjustments to the production process. The computer could also store, transmit and display all of the above-noted information at remote cathode ray tubes and teletype terminals.

While there has been shown and described preferred embodiments of a leak detector in accordance with the invention, it will be appreciated that many changes and modifications may be made therein without, however, departing from the essential spirit of the invention.

I claim:

1. A leak detector for testing sealed containers formed of flexible or semi-rigid material, said detector comprising:
   A. a chamber for enclosing a container to be tested,
   B. means to pressurize said chamber to cause a perfectly sealed container to distort due to the difference between internal container pressure and chamber pressure, a slightly imperfect container undergoing a small loss of distortion after a predetermined time period and a highly imperfect container experiencing no distortion, C. a sensor in the chamber responsive to a dimension of the container to produce a signal indicative thereof, D. means to derive a first signal from the sensor before the chamber is pressurized and to hold the first signal, E. means to derive a second signal from the sensor when the chamber is pressurized and upon the conclusion of said predetermined period, F. means to compare the second signal with said held first signal to provide an output value indicative of a perfectly sealed container, a slightly imperfect container or a highly imperfect container, and G. means responsive to said output value to accept a perfectly sealed or slightly imperfect container or to reject a highly imperfect container.

2. A leak detector as set forth in claim 1, wherein said first and second signals are analog signals.

3. A leak detector as set forth in claim 1, wherein said first and second signals are digital signals.

4. A leak detector for testing a batch of sealed containers formed of flexible or semi-rigid material, said detector comprising:

A. a chamber for enclosing the batch of containers to be tested,

B. means to pressurize said chamber to cause a perfectly sealed container in said batch to distort due to the difference between internal container pressure and chamber pressure, a slightly imperfect container undergoing a small loss of distortion after a predetermined time period and a highly imperfect container experiencing no distortion, C. a group of sensors in said chamber, each coupled to a respective container in the batch thereof to produce an analog signal indicative of a container dimension, D. an analog-to-digital converter, E. means to apply the signals from said sensors, before said chamber is pressurized, sequentially to said converter to produce a first series of equivalent digital signals, F. means to hold said first series of digital signals, G. means to apply the signals from the sensors when said chamber is pressurized and after said predetermined period has elapsed, sequentially to said converter to produce a second series of equivalent digital signals, H. means to compare each held signal in the first series with the corresponding signal in the second series to provide an output value indicative of a perfectly sealed container, a slightly imperfect container or a highly imperfect container, and I. means responsive to said output value to accept the batch of containers if all containers therein are perfectly sealed, and to reject the batch if any one container is imperfect, or to reject any individual container in the batch.

5. A detector as set forth in claim 4, wherein said means to hold said first series of signals is constituted by a series of digital storage registers.

6. A detector as set forth in claim 4, wherein said means to compare each held signal in the first series with the corresponding signal in the second series is constituted by a digital comparator.

7. A detector as set forth in claim 6, wherein said means responsive to the output value of each digital comparator includes a first storage register.

8. A detector as set forth in claim 7, further including an indicator coupled to said first storage register to indicate the condition of the seal under test.

9. A detector as set forth in claim 8, further including means coupled to said indicator to determine the frequency of defective seals.

* * * * *